United States Patent Office 3,396,520
Patented Aug. 13, 1968

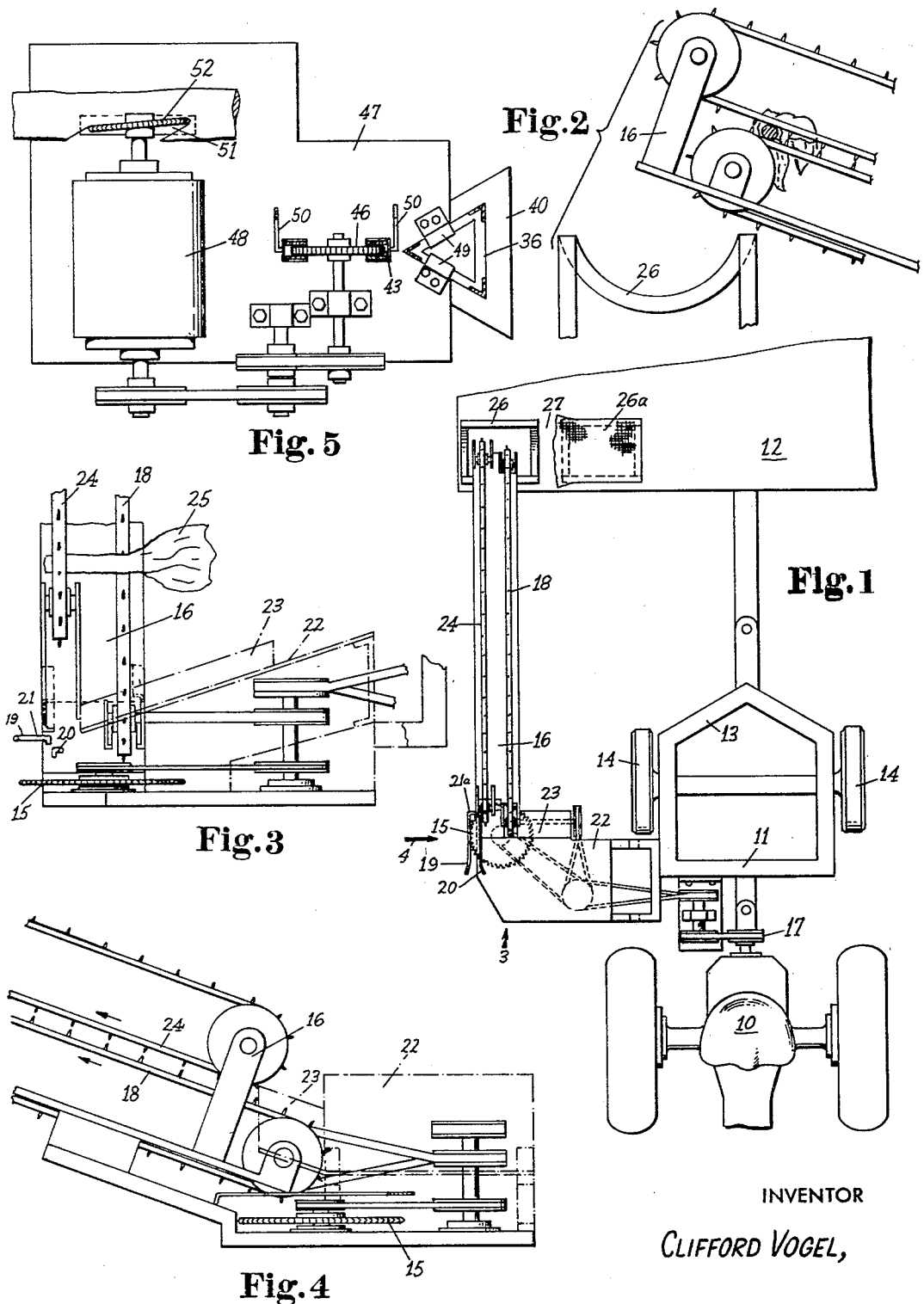

3,396,520
APPARATUS FOR THE HARVESTING
OF TOBACCO
Clifford E. Vogel, R.F.D. 1, Winchester, Ohio 45697
Filed May 25, 1965, Ser. No. 458,697
5 Claims. (Cl. 56—27.5)

ABSTRACT OF THE DISCLOSURE

Tobacco harvester having a stalk cutter and a guide causing the cut stalks to fall uniformly and in succession into a horizontal position, and including a pair of counter rotating, horizontally displaced belts for conveying the cut stocks to a suitable receiving member.

The harvesting and storing of tobacco has undergone substantially no change for as long as tobacco has been harvested. It is the general practice for tobacco plants to be cut manually close to the ground and impaled upon a stick. The stick is provided with a sharp pointed metallic end which is readily removable so that it can be applied to one stick after another. The tobacco plant is impaled by means of the metallic pointed end near the cut end of the stalk and a plurality of plants are thus impaled upon a single stick. These sticks are then carried into the curing barn and are laid across supporting elements built into the barn so that the tobacco plants hang leaf down. The sticks are then arranged in the barn in a number of rows with additional tiers of sticks above the lowermost tier until the barn is filled.

This procedure is very slow and requires a great deal of labor and it is therefore the principal object of the present invention to provide a method of harvesting and storing tobacco which will eliminate a large part of the labor heretofore required and whereby a tobacco crop can be harvested and stored very much more expeditiously.

It is another object of the invention to provide a harvesting apparatus which may be pulled through a tobacco field by a prime mover such as a tractor, which will cut the plants off adjacent the ground and which is provided with a conveyor to convey the cut stalks to a wagon which is also towed by the prime mover to where the cut stalks are stacked.

These and other objects of the invention which will be described in more detail hereinafter are accomplished by that certain construction and arrangement of parts of which the following describes an exemplary embodiment.

Reference is made to the drawings forming a part hereof and in which:

FIG. 1 is a fragmentary plan view showing a prime mover towing the harvesting unit and wagon.

FIG. 2 is a fragmentary side elevational view of the upper end of the conveyor and the receiving trough in the wagon.

FIG. 3 is a front elevational view of the harvesting unit as seen along the line of the arrow 3 in FIG. 1.

FIG. 4 is a side elevational view of the lower end of the conveyor and the associated cutting element as seen along the line of the arrow 4 of FIG. 1.

FIG. 5 is a plan view of the drive unit for the vertical conveyor showing the conveyor tower in cross section.

Briefly, in the practice of the invention, the novel method here disclosed involves the cutting of the tobacco plants by means of a power driven cutting unit which is towed through a field of tobacco. The stalks are cut off near the ground and as the stalks are cut, they are caused to fall in the same direction to a position to be engaged between upper and lower conveyor belts which carry the cut stalks from ground level up to a wagon which is being towed behind the cutting unit. The cut stalks arriving at the wagon are deposited in a receiving trough and a laborer on the wagon will remove bunches of stalks from the receiving trough and stack them conveniently in the wagon.

Referring now in more detail to the drawings, a portion of a prime mover or tractor is shown at 10 and hitched to the tractor 10 is the cutting unit generally indicated at 11. A wagon 12 may be hitched to the cutting unit as shown. The cutting unit itself may comprise a simple frame 13 providing for the mounting of wheels 14 to ride upon the ground and to provide a support for the cutter 15 and the lower end of the conveyor generally indicated at 16. The cutting element 15 may be a circular saw as shown and it is driven by means of belts or the like from a power take-off 17 of the prime mover. The particular arrangement of driving pulleys and belts need not be described in detail since it is believed that it will be clear from the drawing. The lower conveyor belt 18 is also driven from the same power take-off 17 as shown.

In order to guide stalks to be cut to the cutting element, the guide fingers 19 and 20 are provided. The ends of these fingers flare outwardly as shown and the finger 19 is disposed at a higher elevation than the finger 20 and is provided with an elbow 21 to cause the cut stalks to fall over toward the right, as seen in FIGS. 1 and 3. As the stalks fall to the right, they fall upon an inclined plate 22 which has an upwardly sloping portion 23, so that the stalk comes into a position to be engaged between the belts 18 and 24 of the conveyor 16.

As will be seen in FIG. 4, the adjacent flights of the belts 18 and 24, which move in the direction of the arrows as shown, are spaced apart approximately the thickness of the stalks being cut and by reference to FIG. 3 and FIG. 1, it will be seen that the lower belt 18 is positioned inwardly of the upper belt 24. The stalk thus falls on top of the belt 18 and the cut end of the stalk comes under the belt 24 which thus resists the turning moment of the plant about the belt 18. A plant being carried by the conveyor is indicated in broken lines at 25 in FIG. 3.

The upper end of the conveyor 16 is secured to the wagon in any suitable manner (not shown) and the plants arriving at the upper end of the conveyor 16 are deposited in a trough-like element indicated in FIG. 2 at 26. As better seen in FIG. 1, this trough element is in fact composed of two sections 26 and 26a separated by a space 27 of sufficient width for an operator's arm to pass through. The trough may be constituted by wire frame members covered by a burlap sack. When a number of plants have been deposited in the member 26, a laborer standing in the wagon simply picks up a bundle by passing his arm through the space 27 and then stacks the plants in the wagon. When the wagon is fully loaded, it is towed to the barn where the tobacco is to be stored for curing.

It will be understood that numerous modifications may be made without departing from the spirit of the invention and no limitation is intended or should be assumed other than as set forth in the claims which follow.

The embodiments of the invention in which an exclusive property or privilege is claimed are defined as follows:

1. A harvester for tobacco plants and the like, comprising a carriage to be adapted to be hitched to a prime mover having a power take-off, said carriage having a stalk cutter arranged to cut the stalks of plants adjacent the ground, a guide mounted on said carrier and arranged in front of said stalk cutter to guide stalks into position for cutting by said cutter, means associated with said cutter to cause said cut stalks to fall to a predetermined substantially horizontal position, and a conveyor mounted on said carriage for carrying the cut plants from said predetermined position, said conveyor including two counter-rotating belts, the spacing between the adjacent flights of said belts being roughly that of the diameter of the stalks being cut, said belts being displaced horizontally such that the lower flight is farther from the cut end of the stalk than the upper flight, whereby the upper flight opposes the rotating moment of the cut plant about the lower flight, said cutter and said conveyor being adapted to be driven from said power take-off.

2. A harvester according to claim 1, wherein said stalk cutter is a rotary saw.

3. The harvester claimed in claim 1 including a wagon hitched to said carriage, and a receiving member for said stalks mounted on said wagon.

4. A harvester according to claim 3, wherein said conveyor slants upwardly from said cutter to said receiving member on said wagon.

5. A harvester according to claim 3, wherein said receiving member is constituted by a trough shaped member separated intermediate its ends to permit an operator's arm to pass through in lifting a bundle of cut plants out of said receiving member.

References Cited

UNITED STATES PATENTS

| | | | |
|---|---|---|---|
| 908,342 | 12/1908 | Short et al. | 56—27.5 |
| 2,497,845 | 2/1950 | Burkhart | 56—27.5 |
| 2,813,390 | 11/1957 | Irvine | 56—27.5 |
| 3,178,873 | 4/1965 | Meyer | 56—27.5 |
| 3,229,831 | 1/1966 | Long | 56—27.5 XR |

RUSSELL R. KINSEY, *Primary Examiner.*